(12) United States Patent
Chen et al.

(10) Patent No.: US 8,179,981 B2
(45) Date of Patent: May 15, 2012

(54) METHOD AND APPARATUS FOR DETERMINING BIT ALLOCATION FOR GROUPS OF PIXEL BLOCKS IN A PICTURE ACCORDING TO ATTENTION IMPORTANCE LEVEL

(75) Inventors: Zhi Bo Chen, Beijing (CN); Xiao Dong Gu, Beijing (CN); Qu Qing Chen, Beijing (CN)

(73) Assignee: Thomson Licensing, Issy-les-Moulineaux (FR)

( * ) Notice: Subject to any disclaimer, the term of this patent is extended or adjusted under 35 U.S.C. 154(b) by 943 days.

(21) Appl. No.: 12/224,080

(22) PCT Filed: Feb. 16, 2007

(86) PCT No.: PCT/EP2007/051500
§ 371 (c)(1),
(2), (4) Date: Aug. 15, 2008

(87) PCT Pub. No.: WO2007/099039
PCT Pub. Date: Sep. 7, 2007

(65) Prior Publication Data
US 2010/0183069 A1 Jul. 22, 2010

(30) Foreign Application Priority Data
Mar. 2, 2006 (EP) .................................... 06300184

(51) Int. Cl.
*H04N 7/64* (2006.01)
(52) U.S. Cl. .................................................. 375/240.27
(58) Field of Classification Search .......... 375/130–153, 375/240.01–240.29; 704/500–504; *G10L 19/00, G10L 21/04; H04N 7/12, 11/02, 11/04; H04B 1/00, H04B 1/66*
See application file for complete search history.

(56) References Cited

U.S. PATENT DOCUMENTS
2007/0076957 A1 * 4/2007 Wang et al. .................... 382/195

FOREIGN PATENT DOCUMENTS
WO WO 2006107280 A1 * 10/2006

OTHER PUBLICATIONS

Wei Lai et al: "A content-based bit allocation model for video streaming" Multimedia and Expo, 2004, IEEE International Conference on Taipei, Taiwan Jun. 27-30, 2004, vol. 2, pp. 1315-1318 XP010771069.

(Continued)

*Primary Examiner* — Y Lee
*Assistant Examiner* — Brent R. Lindon
(74) *Attorney, Agent, or Firm* — Myers Wolin, LLC

(57) ABSTRACT

Optimised bit allocation is important in video compression to increase the coding efficiency, i.e. to make optimum use of the available data rate. In view of the human visual system, a human usually pays more attention to some part of a picture rather than to other parts of that picture. Therefore the bit allocation should be optimised for different-attention picture areas ($GOB_i$). The inventive distortion-driven bit allocation scheme allocates the coding/decoding error distortion to picture areas consistently with the human visual system, and satisfies the constraint of bit rate as well. The invention uses a distortion/bitrate/rhoquantization parameter histogram analysis. Based on corresponding tables ($D_{GOBi}[QP_n]$, $R_{GOBi}[QP_n]$ and $\rho_{GOBi}[QP_n]$), the relationships between quantization parameter, rate, distortion and percentage of non-zero coefficients for the different-attention areas are determined (PREALUTI, DISALL, RALL). Thereafter a rho-domain bit rate control is used (RDBALL) for calculating the bit allocation inside each group of macroblocks.

17 Claims, 1 Drawing Sheet

OTHER PUBLICATIONS

Figure 1:
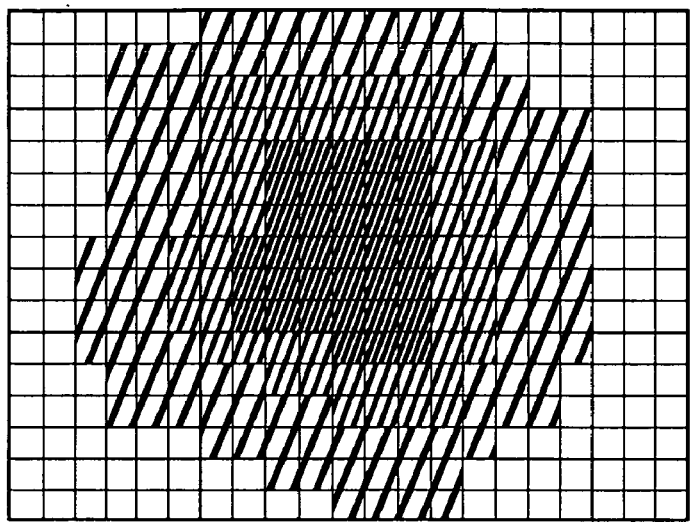

Z. He et al: "A Linear Source Model and a Unified Rate Control Algorithm for DCT Video Coding" IEEE Transactions on Circuits and Systems for Video Technology, vol. 12, No. 11, Nov. 2002, pp. 970-982 XP001133428.

Chih-Wei Tang et al: "A novel visual distortion sensitivity analysis for video encoder bit allocation" Image Processing, 2004, International Conference on Singapore 24-27, 2004, pp. 3225-3228 XP010786484.

S, Sebgyota et al: "Perceptually motivated bit-allocation for H.264 encoded video sequences" Proceedings 2003 International Conference on Image Processing, Sep. 14-17, 2003, IEEE, vol. vol. 2 of 3, pp. 797-800 XP010669954.

Search Report Dated May 29, 2007.

* cited by examiner

METHOD AND APPARATUS FOR DETERMINING BIT ALLOCATION FOR GROUPS OF PIXEL BLOCKS IN A PICTURE ACCORDING TO ATTENTION IMPORTANCE LEVEL

This application claims the benefit, under 35 U.S.C. §365 of International Application PCT/EP2007/051500, filed Feb. 16, 2007, which was published in accordance with PCT Article 21(2) on Sep. 7, 2007 in English and which claims the benefit of European patent application No. 06300184.6, filed Mar. 2, 2006.

The invention relates to a method and to an apparatus for determining in picture signal encoding the bit allocation for groups of pixel blocks, whereby these groups of pixel blocks belong to different attention importance levels of corresponding arbitrary-shaped areas of pixel blocks in a picture.

BACKGROUND

Optimised bit allocation is an important issue in video compression to increase the coding efficiency, i.e. to make optimum use of the available data rate. Achieving the best perceptual quality with respect to the limited bit rate is the target of optimised bit allocation. In view of the human visual system, a human usually pays more attention to some part of a picture rather than to other parts of that picture. The 'attention area', which is the perceptual sensitive area in a picture, tends to catch more human attention, as is described e.g. in L. Itti, Ch. Koch, E. Niebur, "A Model of Saliency-Based Visual Attention for Rapid Scene Analysis", IEEE Transactions on Pattern Analysis and Machine Intelligence, Vol. 20, No. 11, November 1998. Therefore optimum bit allocation based on different perceptual importance of different attention picture areas is a research topic in video compression technology.

E.g. the macroblock-layer bit rate control in MPEG2 and MPEG4 selects the values of the quantisation (following transformation) step sizes $Q_{step}$ for all the macroblocks in a current frame so that the sum of the bits used for these macroblocks is close to the frame target bit rate B. MPEG2 and MPEG4 support 31 different values of $Q_{step}$. In MPEG4 AVC a total of 52 $Q_{step}$ values are supported by the standard and these are indexed by a quantisation parameter value QP. Ch. W. Tang, Ch. H. Chen, Y. H. Yu, Ch. J. Tsai, "A novel visual distortion sensitivity analysis for video encoder bit allocation", ICIP 2004, Volume 5, 24-27 Oct. 2004, pp. 3225-3228, propose a description for the visual distortion sensitivity, namely the capability for human vision to detect distortion in moving scenes, while the bit allocation scheme is very simple, by using the formula:

$$QP_N = QP + (1 - VDS_{i,j}/255) * \Delta q \quad (1)$$

where QP is the initial quantisation parameter assigned by the rate control, $\Delta q$ is a parameter for limiting the modification of QP, $VDS_{i,j}$ is the visual distortion sensitivity value of the (i,j)th macroblock (denoted MB) in a picture, and $QP_N$ is the refined quantisation parameter. This bit allocation scheme is rough and simple and does not consider an accurate bit rate control and distortion distribution control.

In S. Sengupta, S. K. Gupta, J. M. Hannah, "Perceptually motivated bit-allocation for H.264 encoded video sequences", ICIP 2003, a picture is divided into foreground and background area, and then a target distortion $D_{tar}$ is pre-decided for foreground quality without guarantee for the background quality. The quality of the background varies as a function of the distance from the foreground. The rate of degradation is controlled by a visual sensivity factor $$S = e^{-d/a} \quad (2)$$

where a is a constant controlling the rate of fall of the background degradation and d is the distance of a background pixel from the nearest foreground pixel. This scheme tries to give a distortion distribution consistent with the human visual system, while its performance suffers from the accuracy of the used model, and it does not explain how to get $D_{tar}$ and to keep the quality degradation according to given equations under a pre-determined bit budget.

In order to solve the problem of optimised bit allocation with bit budget constraint, typical bit allocation algorithms are based on a Rate-Distortion optimisation with Lagrangian multiplier processing which can be described as a constraint optimisation problem to minimise the total distortion D with the constraint rate R less than $R_T$, using an expression like:

$$\min J : J = D + \lambda \times R = \sum_{i=1}^{N} D_i + \lambda \times \sum_{i=1}^{N} R_i \quad (3)$$

where $D_i$ and $R_i$ are the distortion and the bit rate of each unit i (MB or attention area).

Assuming that the rate and distortion of each MB are only dependent on the choice of the encoding parameters as described above, the optimisation of equation (3) can be simplified to minimise the cost of each MB separately:

$$\min J_i : J_i = D_i + \lambda \times R_i \quad (4)$$

It has been proposed to use an optimised bit allocation scheme based on modifying the Lagrange multiplier in the coding mode decision of each MB according to formula:

$$\lambda' = \alpha \times \lambda \quad (5)$$

where $\alpha$ is a scaling factor for modifying the Lagrange multiplier according to different levels of perceptual importance.

It has also been proposed to add a different weighting factor $W_i$ to the distortion of different attention areas to perform optimised bit allocation:

$$\min J : J = \sum_{i=1}^{N} w_i \times D_i + \lambda \times \sum_{i=1}^{N} R_i \quad (6)$$

whereby the rate and distortion model can be deduced based on a $\rho$-domain bit rate control model like this one:

$$R_i = A \rho_i + B$$

$$D_i = 384 \sigma_i^2 e^{-\theta \sigma_i / 384} \quad (7)$$

Equations (7) can be put into equation (6) to get the optimised solution for bit allocation.

It is also known to use a Rate-Distortion model based on Gaussian distribution to get an optimum result for bit allocation, as shown in formula (8):

$$D_i = \sigma_i^2 \times e^{-\gamma R_i} \quad (8)$$

INVENTION

However, known methods can not significantly influence the distortion distribution so as to make it more consistent with the properties of the human visual system. For example, using a different weighting factor $W_i$ for different attention areas according to their different importance to human eyes can not really influence the distortion distribution accordingly. In addition, known methods are not accurate enough (especially on MB level) to get a better performance. Further, known methods have problems in keeping a good trade-off between distortion distribution and bit allocation constraint.

A problem to be solved by the invention is to provide an improved distortion-driven bit allocation for bit rate control in video signal encoding. This problem is solved by the method disclosed in claim 1. An apparatus that utilises this method is disclosed in claim 2.

The inventive distortion-driven bit allocation scheme allocates the coding/decoding error distortion to picture areas consistently with the human visual system, and satisfies the constraint of bit rate as well. "Distortion-driven" means a bit allocation achieving an optimised coding/decoding error distortion distribution under bit rate constraint, whereby the primary target is not to minimise the total distortion. The invention makes the distortion distribution inside a picture more consistent with the human visual properties, and thus achieves a much better subjective quality with limited bit rate, or allows decreasing the bit rate while keeping a consistent subjective quality.

The invention uses a distortion/bitrate/Rho-quantisation parameter histogram analysis. Based on such histogram analysis, the relationships between quantisation parameter, rate, distortion and percentage of non-zero coefficients are determined. The distortion allocation scheme is based on the assumption of Gaussian distribution of the residual signals (following mode decision and intra or inter prediction, before transform and quantisation). Then a rho-domain ($\sigma$-domain) bit rate control is used for calculating the bit allocation inside each group of macroblocks (GOB).

In principle, the inventive method is suited for determining in picture signal encoding, which includes transform and quantisation of transform coefficient blocks, the bit allocation for groups of pixel blocks in a picture, whereby said picture is divided into a regular grid of pixel blocks and said groups of pixel blocks belong to different attention importance levels of corresponding arbitrary-shaped areas of pixel blocks in said picture, and wherein the encoding/decoding distortion of each group of pixel blocks is to be controlled such that it is basically proportional to the attention importance level for that group of pixel blocks, and wherein a bit budget is given for the encoded picture and said quantisation is controlled by a quantisation parameter, said method including the steps:

for the current picture, with respect to candidates of said quantisation parameter, establishing for each group of pixel blocks tables or lists or functions for the estimated distortion and for the bit rate and for the number of zero-amplitude coefficients following said quantisation;

calculating for each one of said groups of pixel blocks the corresponding distortion distribution, using said tables or lists or functions for the estimated distortion and for the bit rate and, using also the output from the following step, modifying said distortion distribution in order to reach said bit budget;

based on said tables or lists or functions for the estimated distortion and for the bit rate, and based on said calculated distortion distribution, calculating an estimated bit rate for each one of said groups of pixel blocks;

performing a rho-domain bit allocation for each one of said groups of pixel blocks using said estimated bit rate and said table or list or function for the number of zero-amplitude coefficients, to determine the corresponding one of said quantisation parameters for quantising and encoding the pixel blocks.

In principle the inventive apparatus is suited for determining in picture signal encoding, which includes transform and quantisation of transform coefficient blocks, the bit allocation for groups of pixel blocks in a picture, whereby said picture is divided into a regular grid of pixel blocks and said groups of pixel blocks belong to different attention importance levels of corresponding arbitrary-shaped areas of pixel blocks in said picture, and wherein the encoding/decoding distortion of each group of pixel blocks is to be controlled such that it is basically proportional to the attention importance level for that group of pixel blocks, and wherein a bit budget is given for the encoded picture and said quantisation is controlled by a quantisation parameter, said apparatus including:

means being adapted for establishing, for the current picture, with respect to candidates of said quantisation parameter, for each group of pixel blocks tables or lists or functions for the estimated distortion and for the bit rate and for the number of zero-amplitude coefficients following said quantisation;

means being adapted for calculating for each one of said groups of pixel blocks the corresponding distortion distribution, using said tables or lists or functions for the estimated distortion and for the bit rate and, using also the output from the following step, modifying said distortion distribution in order to reach said bit budget;

means being adapted for calculating, based on said tables or lists or functions for the estimated distortion and for the bit rate, and based on said calculated distortion distribution, an estimated bit rate for each one of said groups of pixel blocks;

means being adapted for performing a rho-domain bit allocation for each one of said groups of pixel blocks using said estimated bit rate and said table or list or function for the number of zero-amplitude coefficients, to determine the corresponding one of said quantisation parameters for quantising and encoding the pixel blocks.

Advantageous additional embodiments of the invention are disclosed in the respective dependent claims.

DRAWINGS

Figure 2:
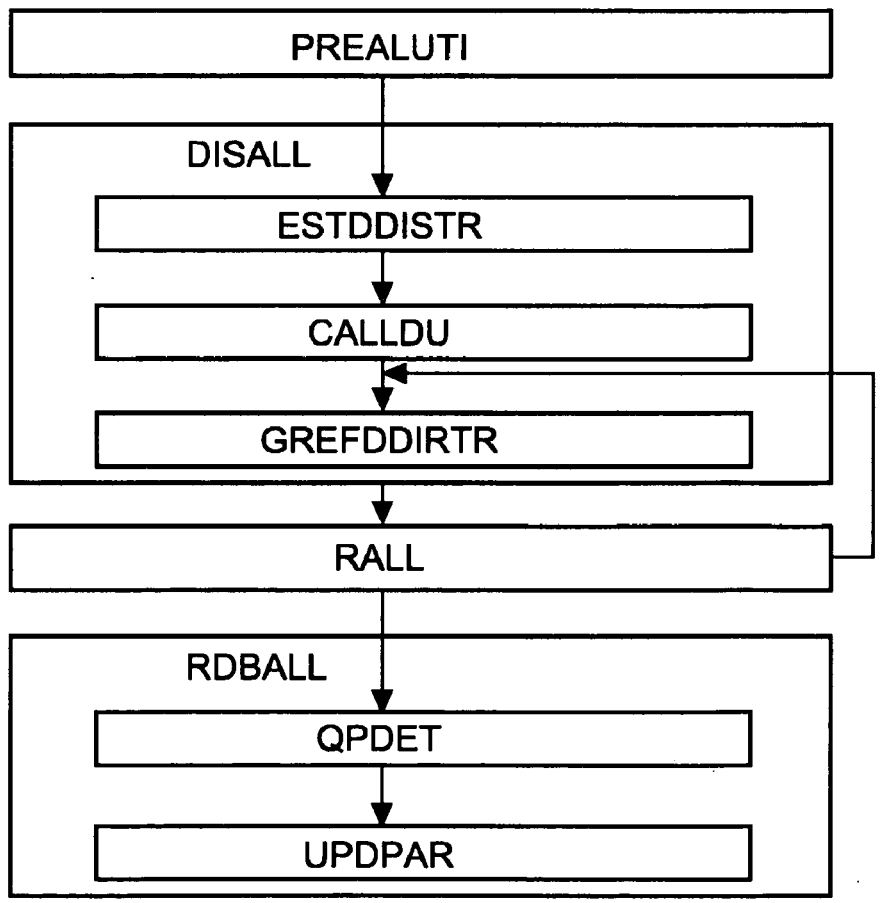

Exemplary embodiments of the invention are described with reference to the accompanying drawings, which show in:
FIG. 1 example attention mask;
FIG. 2 flowchart for the inventive content based distortion-driven bit allocation (CDBA) scheme.

EXEMPLARY EMBODIMENTS

As mentioned above, humans pay more attention to some parts of a picture than to other parts of that picture. The part receiving more human attention are called 'attention area'. In the above-mentioned article from L. Itti et al. and in EP application 05300974.2, a set of grey-level feature maps is extracted from the visual input of a given image. These features include intensity, colour, orientation, and so on. Then in each feature map, the most salient areas are picked out. Finally all feature maps are integrated, in a purely bottom-up manner, into a master 'saliency map' which is regarded as the attention information of a picture. Therefrom an attention mask can be obtained for each picture, which mask describes the different attention importance levels of corresponding areas of that picture.

FIG. 1 shows an example attention mask that divides macroblocks in the picture into a set of four levels $M_i$ of attention importance, i=1 . . . 4. To the white blocks the level $M_4$ is assigned, to the slightly hatched blocks the level $M_3$ is assigned, to the strongly hatched blocks the level $M_2$ is assigned, and to the diagonally hatched blocks the level $M_1$ is assigned. A larger $M_i$ value means that a larger distortion can be tolerated because it is a less visually important area. E.g. in case N=2, $M_1$=1 and $M_2$=2 it means that the background distortion level (level 2) can be two times the foreground distortion level (level 1).

How to calculate the level sets and the corresponding visual importance values $M_i$ is not described in detail here. The bit allocation scheme can be based on the assumption that the attention mask has been obtained with $M_i$, (i=1 ... N), where N is the number of attention levels.

Basically, the distortion-driven bit allocation problem can be described as follows:

According to the attention mask, the picture can be divided into N GOBs (groups of macroblocks) according to different attention or mask values $M_i$, each $GOB_i$ contains $K_i$ macroblocks (denoted MB), and $$\sum_{i=1}^{N} K_i = N_{MB},$$

where $N_{MB}$ is the total number of MBs in one picture. With a frame bit budget $R_f$ which can be derived from any frame-level bit rate control, the inventive processing allocates the distortion $\overline{D_i}$ for each MB in $GOB_i$ according to the corresponding attention mask value $M_i$, by these two constraints:

$$\overline{D_i} = D_u \times M_i \qquad (9)$$

$$\sum_{i=1}^{N} \overline{R_i} \approx R_f \qquad (10)$$

where $\overline{R_i}$ is the bit rate allocated to each $GOB_i$ and $D_u$ is a constant distortion unit for each MB. Equation (9) means that the distortion of each $GOB_i$ is (basically) proportional to its attention mask value and then the distortion distribution will be consistent with the human perception. Equation (10) means that the total frame or picture bit budget $R_f$ should be met in this case. Therefore the invention shall provide a distortion-driven bit allocation scheme based on visual attention analysis, and the resulting distortion and bit rate should meet the requirements of equations (9) and (10).

In FIG. 2 a flowchart for the inventive content based distortion-driven bit allocation scheme (CDBA) is depicted. Since many research work has been published about constructing an attention area model, e.g. the above-mentioned article from L. Itti et al. and EP application 05300974.2, it is assumed that the attention mask has been obtained already, that the picture has been divided into N GOBs, and that the frame bit budget $R_f$ has been derived from any frame-level or field-level rate control algorithm. Then the following steps are carried out to calculate the distortion-driven bit allocation:

Step 1) Pre-Analysis and Look-Up Table Initialisation PRE-ALUTI

For the currently processed picture, for each $GOB_i$, (i=1 ... N), based on the histogram analysis algorithms, three look-up tables or lists or functions $D_{GOB_i}[QP_n]$, $R_{GOB_i}[QP_n]$ and $\rho_{GOB_i}[QP_n]$ are determined for each GOB, wherein $QP_n$ is the candidate quantisation parameter, $D_{GOB_i}[QP_n]$ is the estimated distortion (in units of average distortion per MB), $R_{GOB_i}[QP_n]$ is the bit rate of each $GOB_i$ under quantisation parameter $QP_n$, and $\rho_{GOB_i}[QP_n]$ is the number of zero-amplitude coefficients of $GOB_i$, following quantisation using quantisation parameter $QP_n$.

Step 2) Distortion Allocation DISALL

Step 2.1) Estimate Distortion Distribution Under Constant Bit Rate ESTDDISTR

Assume each $GOB_i$ contains $K_i$ MBs, and $$\sum_{i=1}^{N} K_i = N_{MB},$$

where $N_{MB}$ is the total number of MBs in one picture, then the allocated bit rate for each $GOB_i$ in case of Constant Bit Rate (CBR) output (i.e. without regarding different distortion levels in the different attention level areas) should be $$R_i = R_f \times \frac{K_i}{N_{MB}}.$$

Therefore the corresponding initial distortion value $\overline{D_i}$ for each $GOB_i$ can be derived by looking up the tables $D_{GOB_i}[QP_n]$ and $R_{GOB_i}[QP_n]$ This distortion value is used in the following as a distortion multiplication value with a constraint bit budget.

Step 2.2) Calculate Distortion Unit CALLDU

Based on the assumption that the residual signal amplitudes (i.e. the transformed prediction error signals) have a Gaussian distribution and a corresponding rate distortion model (cf. W. Lai, X. D. Gu, R. H. Wang, W. Y. Ma, H. J. Zhang, "A content-based bit allocation model for video streaming", ICME '04, 2004 IEEE International Conference on Multimedia and Expo, Volume 2, 27-30 Jun. 2004, pp. 1315-1318), the following formula can be used to get the distortion unit of $D_u$:

$$D_u = e^{(\sum_{i=1}^{N} \ln \overline{D_i} - \sum_{i=1}^{N} \ln M_i - \sum_{i=1}^{N} \ln K_i)/N} \qquad (11)$$

Step 2.3) Get the Refined Distortion Distribution GREFD-DIRTR

Get the allocated distortion $\overline{D_i}$ for each MB in $GOB_i$ by using formula (9): $\overline{D_i} = D_u \times M_i$. Due to inaccuracy of the Gaussian distribution assumption, a minor modification can be carried out based on a feedback from Step 3) in order to reach the given bit budget.

Since distortion or bit rate under each quantisation parameters should be discrete and one can not achieve the exact distortion value under formula $\overline{D_i} = D_u \times M_i$, the look-up table produced in the pre-analysis Step 1) can be used and the value $\overline{D_i}$ is adapted so as to be the one in that distortion look-up table which is most close to the estimated value of $D_u \times M_i$.

Concerning the feedback from Step 3), where the estimated bit rate $\overline{R_i}$ in Step 3) is larger or smaller than the bit budget, some modification can be performed in Step 2) by checking adjacent values (close to $D_u \times M_i$) in the look-up table to reach the given bit budget.

Step 3) Bit Rate Allocation RALL

Based on table of $D_{GOB_i}[QP_n]$ and $R_{GOB_i}[QP_n]$ and $\overline{D_i}$ from Step 2), the estimated rate $\overline{R_i}$ can be directly obtained for each $GOB_i$, i=1 ... N. And the estimated result is fed back to Step 2.3) to do some minor emendation on the allocated rate in order to reach the bit budget.

Step 4) Rho-Domain Bit Allocation Inside Each $GOB_i$ RDBALL

Step 4.1) Quantisation Parameter Determination QPDET

Similar to the ρ domain rate control model in Z. He and S. K. Mitra, "A linear source model and a unified rate control algorithm for DCT video coding", IEEE Transactions on Circuits and Systems for Video Technology, Vol. 12, No. 11, November 2002, pp. 970-982, the number of zeros to be produced by quantising the remaining MBs inside $GOB_i$ should be:

$$\rho = 384 * (K_i - N_i^c) - \frac{\overline{R}_i - R_i^c}{\theta} \quad (12)$$

where $N_i^c$ is the number of the coded MBs of $GOB_i$ in the current picture, $R_i^c$ is the number of bits used to encode these $N_i^c$ MBs, and $K_i$ is the total number of the MBs of $GOB_i$. Looking-up table $\rho_{GOB_i}[QP_n]$, the quantisation parameter QP is determined. Then the current MB is quantised using that QP value and is encoded.

Step 4.2) Update Parameters UPDPAR

Updating of the parameters θ and $\rho_{GOB_i}[QP_n]$ according to the already encoded MBs:

$$\theta = \frac{R_i^c}{384 * N_i^c - \rho_i^c} \quad (13)$$

where $\rho_i^c$ is the number of quantised zero coefficients in these coded $N_i^c$ MBs. Thereafter the next macroblock is encoded.

In the following, additional explanations for steps 1) to 4) are given:

Step 1) Pre-Analysis and Look-Up Table Initialisation

Based on the algorithm proposed by S. H. Hong, S. D. Kim, "Histogram-based rate-distortion estimation for MPEG-2 video", IEE Proceedings Vision, Image Signal Processing, Vol. 146, No. 4, August 1999, pp. 198-205, a histogram based rate-distortion estimation for the ISO/IEC 14496-10 AVC/H.264 standard is carried out. The basic assumptions are: the distortion in terms of mean squared error (MSE) is proportional to the square of the applied quantisation parameter, and a uniform quantisation is normally used in existing video coding standards. Then an iterative algorithm can be used to estimate the distortion of different quantisation parameters according to $D(QP_n)=D(QP_{n-1})+\Delta D(QP_{n-1}, QP_n)$, where $\Delta D(QP_{n-1}, QP_n)$ is the distortion increment when the quantisation parameter increases from $QP_{n-1}$ to $QP_n$.

Thereafter a histogram or list $Hist^{1 \to 0}[QP_n]$ based on DCT coefficient magnitudes and related QP is established for the current GOB (group of macroblocks). This histogram represents the number of DCT coefficients which are quantised to amplitude amount '1' when applying $QP_n$, but will be quantised to amplitude '0' when applying the following quantisation parameter $QP_{n+1}$.

Based on the above histogram or list $Hist^{1 \to 0}[QP_n]$, for H.264/AVC one can easily establish the look-up table of the number of non-zero magnitude coefficients under each quantisation parameter by formula $$NZC[QP_n] = N_{coeff} - \sum_{i=0}^{n-1} Hist^{1 \to 0}[QP_i], \; 0 \le n \le 51,$$

wherein $N_{Coeff}$ is the total number of coefficients in each unit (which is GOB in this invention).

To each quantisation parameter $QP_n$ belongs a corresponding quantisation step $QPS_n$ that can be derived from a corresponding look-up table e.g. in the H.264/AVC standard.

In order to estimate the distortion increment $\Delta D(QP_{n-1}, QP_n)$ between two successive QP values accurately, three cases are considered:

Case 1) the quantised coefficient is not zero at $QP_n$;

Case 2) the quantised coefficient is not zero at $QP_{n-1}$ but it is quantised to zero at $QP_n$;

Case 3) the quantised coefficient is zero at $QP_{n-1}$.

For Case 1) the distortion increment can be estimated using the following formula, based on the assumption that the residual signal is uniformly distributed inside the quantisation level gap:

$$UD(QP_n) = \frac{1}{QPS_n} \int_{k*QPS_n - \delta_n}^{(k+1)*QPS_n - \delta_n} (x - k*QPS_n)^2 dx$$

$$= (QPS_n^2 - 3\delta_n QPS_n + 3\delta_n^2)/3$$

$$\Delta E_1(QP_n) = \{UD(QP_n) - UD(QP_{n-1})\} \times \frac{NZC[QP_n]}{N_{Coeff}}$$

where $UD(QP_n)$ is the distortion introduced by $QP_n$ in Case 1) where the assumption of uniform distribution exists, and $\Delta E_1(QP_n)$ represents the distortion increase from $QP_{n-1}$ to $QP_n$ in Case 1).

For Case 2) the distortion increment can be estimated using the following formula:

$$\Delta E_2(QP_n) = \left\{ \frac{1}{(QPS_n - \delta_n) - (QPS_{n-1} - \delta_{n-1})} \times \right.$$

$$\left. \int_{QPS_{n-1} - \delta_{n-1}}^{QPS_n - \delta_n} x^2 dx - UD(QP_{n-1}) \right\} \times$$

$$\frac{Hist^{1 \to 0}[QP_n]}{N_{coeff}}$$

$$= \{(QPS_n - \delta_n)^2 + (QPS_n - \delta_n) \cdot (QPS_{n-1} - \delta_{n-1}) +$$

$$QPS_{n-1} \cdot \delta_{n-1} - 2\delta_{n-1}^2\}/3 \times$$

$$\frac{Hist^{1 \to 0}[QP_n]}{N_{Coeff}}$$

For Case 3) there is no distortion increment.

In H.264/AVC, $\delta_n$ is $$\frac{2 \times QPS_n}{3}$$

in case of DC transform used in the intra 16×16 mode and $$\delta_n = \frac{QPS_n}{3}$$

is used in other cases of intra coding, and $$\frac{QPS_n}{6}$$

is used in case of inter coding. Then the final distortion increment is $\Delta D^e(QP_{n-1}, QP_n) = \Delta E_1(QP_n) + \Delta E_2(QP_n)$.

The initial value of the iterative distortion estimation method is $$D^e(QP_0) = UD(QP_0) \times \frac{NZC[QP_0]}{N_{Coeff}} +$$

$$\frac{1}{QPS_0 - \delta_0} \times \int_0^{QPS_0 - \delta_0} x^2 dx \times \frac{N_{Coeff} - NZC[QP_0]}{N_{Coeff}}.$$

Then the QP-Distortion table $D_{GOB_i}[QP_n]$ can be established.

Because, as is known from the above Z. He and S. K. Mitra article, the number of non-zero amplitude coefficients is proportional to the number of coded bits, the liner model can fit very well. Therefore a linear model is used to estimate the bit rate based on the established list NZC.

Assuming that the number of coded bits will be zero when the number of non-zero coefficients is zero, a corresponding interpolation line can be fixed if at least two points on the line are given. One reference point QP is set to $QP_{ref}$, then the real number of coded bits $R_{bits}$ is determined by entropy coding or by estimating it through frequency analysis (e.g. according to Q. Chen, Y. He, "A Fast Bits Estimation Method for Rate-Distortion Optimisation in H.264/AVC", Picture Coding Symposium, 15-17 Dec. 2004, San Francisco, Calif., USA) according to different complexity and accuracy requirements. Combining this linear model and the look-up table NZC $[QP_n]$, the QP-Rate table of $R_{GOB_i}[QP_n]$ can be constructed by the following formula:

$$\frac{R^e_{bist}[QP_n]}{NZC[QP_n]} = \frac{R_{bits}}{NZC[QP_{ref}]}$$

Then based on non-zero list or table $NZC[QP_n]$, one can easily get the QP-ρ Table $\rho_{GOB_i}[QP_n]$ using the following formula:

$$\rho[QP_n] = 1 - \frac{NZC[QP_n]}{N_{Coeff}}$$

Step 2) Distortion Allocation

Based on the assumption of Gaussian distribution of the residual signals, a simplified rate-distortion model as equation (8) has been used in optimum bit allocation. Based on equations (8) and (10), one basic conclusion can be arrived:

$$\prod_{i=1}^{N} D_i = \prod_{i=1}^{N} \sigma_i^2 \times e^{-\gamma \sum_{i=1}^{N} R_i} = \prod_{i=1}^{N} \sigma_i^2 \times e^{-\gamma R_f} \quad (14)$$

Therefore the multiplication result of the distortion of each GOB should keep constant with a given bit budget $R_f$. As described in Step 2.1), the $\overline{D}_i$ of each $GOB_i$ in the CBR case can be easily derived by looking up tables $D_{GOB_i}[QP_n]$ and $R_{GOB_i}[QP_n]$ and then based on equations (14) and (9):

$$\prod_{i=1}^{N} \overline{D}_i = \prod_{i=1}^{N} \sigma_i^2 \times e^{-\gamma R_f} = \prod_{i=1}^{N} \overline{D}_i = (D_u)^N \times \prod_{i=1}^{N} M_i \quad (15)$$

With $$D_T = \sum_{i=1}^{N} \log_2 \overline{D}_i,$$

equation (11) can be derived from equation (15).

Since equation (8) is not always accurate enough due to content property differences inside a picture and the quantisation level being limited by a discrete finite set of values, some minor modification can be done based on a feedback from Step 3) to reach the bit budget. The result from equation (11) should always be a good starting point for searching an optimised distortion allocation using the look-up tables.

Step 3) Rate Allocation

The result of this step is fed back to Step 2.3) in order to refine the bit allocation.

Step 4) Bit Allocation Inside Each $GOB_i$

This step is used to accurately meet the bit budget constraint. Usually, if the bit budget is already met in Step 3), the corresponding quantisation parameter derived from the look-up table $R_{GOB_i}[QP_n]$ can be used directly for each GOB. However, an accurate bit allocation with updating is still required to meet the bit budget in case the quantisation parameter and the coding mode in the real coding are different from that in the pre-analysis process (e.g. in H.264/AVC). Therefore the rho-domain rate control is used as a refined bit allocation scheme inside each GOB to distribute the distortion with a limited bit budget.

Instead of being frame based, the invention can also be carried out in a field based manner for interlaced video signals.

The invention can also be used in multi-pass rate control video coding and in error resilience video coding.

The invention claimed is:

1. A method for determining in picture signal encoding, which includes transform and quantization of transform coefficient blocks, a bit allocation for groups of pixel blocks in a picture, whereby said picture is divided into a regular grid of pixel blocks and said groups of pixel blocks belong to different attention importance levels of corresponding arbitrary-shaped areas of pixel blocks in said picture, and wherein an encoding/decoding distortion of each group of pixel blocks is to be controlled such that it is basically proportional to the attention importance level for that group of pixel blocks, and wherein a bit budget is given for an encoded picture and said quantization is controlled by a quantization parameter, the method comprising:

for a current picture, with respect to candidates of said quantization parameter, establishing for each group of pixel blocks, tables or lists or functions for an estimated distortion and for a bit rate and for a number of zero-amplitude coefficients following said quantization;

calculating for the pixel blocks of each group of said groups of pixel blocks a corresponding distortion distribution, using said tables or lists or functions for the estimated distortion and for the bit rate and, using also the output from the following, modifying said distortion distribution in order to reach said bit budget; wherein the calculating for each group of pixel blocks the corresponding distortion distribution further comprises:
without regarding different distortion levels in different attention level areas, calculating a corresponding initial distortion value $\overline{D_i}$ for each group of pixel blocks;
calculating a distortion unit $$D_u = e^{(\sum_{i=1}^N \ln \overline{D}_i - \sum_{i=1}^N \ln M_i - \sum_{i=1}^N \ln K_i)/N},$$

wherein $M_i$ is the attention importance level for a corresponding group of pixel blocks and $K_i$ is the number of pixel blocks in the corresponding group of pixel blocks and N is the number of attention levels;
calculating from said $D_u$ value a refined distortion distribution by $\overline{D_i} = D_u \times M_i$ for each group of pixel blocks, whereby said modifying of said distortion distribution $\overline{D_i}$ is performed here;
based on said tables or lists or functions for the estimated distortion and for the bit rate, and based on said calculated distortion distribution, calculating an estimated bit rate for each group of pixel blocks;
performing a rho-domain bit allocation for each group of pixel blocks using said estimated bit rate and said table or list or function for the number of zero-amplitude coefficients following said quantization, to determine a corresponding one of said quantization parameters for quantizing and encoding the pixel blocks.

2. The method according to claim 1, wherein said pixel blocks are macroblocks.

3. The method according to claim 1, wherein said encoded picture is part of an ISO/IEC 14496-10 AVC encoded picture sequence.

4. The method according to claim 1, wherein said quantization parameter is a quantiser step size.

5. A method for determining in picture signal encoding, which includes transform and quantization of transform coefficient blocks, a bit allocation for groups of pixel blocks in a picture, whereby said picture is divided into a regular grid of pixel blocks and said groups of pixel blocks belong to different attention importance levels of corresponding arbitrary-shaped areas of pixel blocks in said picture, and wherein an encoding/decoding distortion of each group of pixel blocks is to be controlled such that it is basically proportional to the attention importance level for that group of pixel blocks, and wherein a bit budget is given for an encoded picture and said quantization is controlled by a quantization parameter, the method comprising:
for a current picture, with respect to candidates of said quantization parameter, establishing for each group of pixel blocks, tables or lists or functions for an estimated distortion and for a bit rate and for a number of zero-amplitude coefficients following said quantization;
calculating for the pixel blocks of each group of said groups of pixel blocks a corresponding distortion distribution, using said tables or lists or functions for the estimated distortion and for the bit rate and, using also the output from the following, modifying said distortion distribution in order to reach said bit budget;
based on said tables or lists or functions for the estimated distortion and for the bit rate, and based on said calculated distortion distribution, calculating an estimated bit rate for each group of pixel blocks;
performing a rho-domain bit allocation for each group of pixel blocks using said estimated bit rate and said table or list or function for the number of zero-amplitude coefficients following said quantization, to determine a corresponding one of said quantization parameters for quantizing and encoding the pixel blocks, wherein the performing a rho-domain bit allocation for each group of pixel blocks further comprises:
calculating $$\rho = 384 * (K_i - N_i^c) - \frac{\overline{R}_i - R_i^c}{\theta},$$

wherein $N_i^c$ is the number of the coded pixel blocks of the current group of pixel blocks, $R_i^c$ is the number of bits used to encode these $N_i^c$ pixel blocks, and $K_i$ is the total number of the pixel blocks of the current groups of pixel blocks;
determining from said table or list or function for the number of zero-amplitude coefficients following said quantization the corresponding quantization parameter;
updating said table or list or function for the number of zero-amplitude coefficients, and parameter $\theta$ by $$\theta = \frac{R_i^c}{384 * N_i^c - \rho_i^c}$$

according to already encoded pixel blocks, wherein $\rho_i^c$ is the number of quantized zero coefficients in these coded $N_i^c$ pixel blocks.

6. An apparatus for determining in picture signal encoding, which includes transform and quantization of transform coefficient blocks, a bit allocation for groups of pixel blocks in a picture, whereby said picture is divided into a regular grid of pixel blocks and said groups of pixel blocks belong to different attention importance levels of corresponding arbitrary-shaped areas of pixel blocks in said picture, and wherein an encoding/decoding distortion of each group of pixel blocks is to be controlled such that it is basically proportional to the attention importance level for that group of pixel blocks, and wherein a bit budget is given for an encoded picture and said quantization is controlled by a quantization parameter, said apparatus comprising:
means for establishing, for a current picture, with respect to candidates of said quantization parameter, for each group of pixel blocks, tables or lists or functions for an estimated distortion and for a bit rate and for a number of zero-amplitude coefficients following said quantization;
means for calculating for the pixel blocks of each group of said groups of pixel blocks the corresponding distortion distribution, using said tables or lists or functions for the estimated distortion and for the bit rate and, using also the output from the following means, modifying said distortion distribution in order to reach said bit budget, wherein the means for calculating for each group of pixel blocks the corresponding distortion distribution further comprises:
means for calculating, without regarding different distortion levels in different attention level areas, a corresponding initial distortion value $\overline{D_i}$ for each group of pixel blocks;

means for calculating a distortion unit $$D_u = e^{\left(\sum_{i=1}^{N} ln\overline{D}_i - \sum_{i=1}^{N} lnM_i - \sum_{i=1}^{N} lnK_i\right)/N},$$

wherein $M_i$ is the attention importance level for a corresponding group of pixel blocks and $K_i$ is the number of pixel blocks in the corresponding group of pixel blocks and N is the number of attention levels;

means for calculating from said $D_u$ value a refined distortion distribution by $\overline{D}_i = D_u \times M_i$ for each group of pixel blocks, whereby said modifying of said distortion distribution $\overline{D}_i$ is performed here;

means for calculating, based on said tables or lists or functions for the estimated distortion and for the bit rate, and based on said calculated distortion distribution, an estimated bit rate for each group of pixel blocks;

means for performing a rho-domain bit allocation for each group of pixel blocks using said estimated bit rate and said table or list or function for the number of zero-amplitude coefficients, to determine a corresponding one of said quantization parameters for quantizing and encoding the pixel blocks.

7. The apparatus according to claim 6, wherein said pixel blocks are macroblocks.

8. The apparatus according to claim 6, wherein said encoded picture is part of an ISO/IEC 14496-10 AVC encoded picture sequence.

9. The apparatus according to claim 6, wherein said quantization parameter is a quantiser step size.

10. An apparatus for determining in picture signal encoding, which includes transform and quantization of transform coefficient blocks, a bit allocation for groups of pixel blocks in a picture, whereby said picture is divided into a regular grid of pixel blocks and said groups of pixel blocks belong to different attention importance levels of corresponding arbitrary-shaped areas of pixel blocks in said picture, and wherein an encoding/decoding distortion of each group of pixel blocks is to be controlled such that it is basically proportional to the attention importance level for that group of pixel blocks, and wherein a bit budget is given for an encoded picture and said quantization is controlled by a quantization parameter, said apparatus comprising:

means for establishing, for a current picture, with respect to candidates of said quantization parameter, for each group of pixel blocks, tables or lists or functions for an estimated distortion and for a bit rate and for a number of zero-amplitude coefficients following said quantization;

means for calculating for the pixel blocks of each group of said groups of pixel blocks the corresponding distortion distribution, using said tables or lists or functions for the estimated distortion and for the bit rate and, using also the output from the following means, modifying said distortion distribution in order to reach said bit budget;

means for calculating, based on said tables or lists or functions for the estimated distortion and for the bit rate, and based on said calculated distortion distribution, an estimated bit rate for each group of pixel blocks;

means for performing a rho-domain bit allocation for each group of pixel blocks using said estimated bit rate and said table or list or function for the number of zero-amplitude coefficients, to determine a corresponding one of said quantization parameters for quantizing and encoding the pixel blocks, wherein the means for performing a rho-domain bit allocation for each one of said groups of pixel blocks further comprises:

means for calculating $$\rho = 384 * (K_i - N_i^c) - \frac{\overline{R}_i - R_i^c}{\theta},$$

wherein $N_i^c$ is the number of the coded pixel blocks of the current group of pixel blocks, $R_i^c$ is the number of bits used to encode these $N_i^c$ pixel blocks, and $K_i$ is the total number of the pixel blocks of the current groups of pixel blocks;

means for determining from said table or list or function for the number of zero-amplitude coefficients following said quantization the corresponding quantization parameter;

means for updating said table or list or function for the number of zero-amplitude coefficients, and parameter $\theta$ by $$\theta = \frac{R_i^c}{384 * N_i^c - \rho_i^c}$$

according to already encoded pixel blocks, wherein $\rho_i^c$ is the number of quantized zero coefficients in these coded $N_i^c$ pixel blocks.

11. A non-transitory computer readable storage medium that contains or stores, or has recorded on it, a digital video signal encoded according to the method of claim 1.

12. The method according to claim 5, wherein said pixel blocks are macroblocks.

13. The method according to claim 5, wherein said encoded picture is part of an ISO/IEC 14496-10 AVC encoded picture sequence.

14. The method according to claim 5, wherein said quantization parameter is a quantiser step size.

15. The apparatus according to claim 10, wherein said pixel blocks are macroblocks.

16. The apparatus according to claim 10, wherein said encoded picture is part of an ISO/IEC 14496-10 AVC encoded picture sequence.

17. The apparatus according to claim 10, wherein said quantization parameter is a quantiser step size.

* * * * *